United States Patent
Kunau

(10) Patent No.: US 9,033,306 B2
(45) Date of Patent: May 19, 2015

(54) RAPID OPENING GAS VALVE

(75) Inventor: Daniel Kunau, Boone, CO (US)

(73) Assignee: Gaither Tool Company, Inc., Jacksonville, IL (US)

( * ) Notice: Subject to any disclaimer, the term of this patent is extended or adjusted under 35 U.S.C. 154(b) by 414 days.

(21) Appl. No.: 13/051,697

(22) Filed: Mar. 18, 2011

(65) Prior Publication Data
US 2012/0234499 A1   Sep. 20, 2012

(51) Int. Cl.
*F16K 31/122* (2006.01)
*B60C 25/14* (2006.01)

(52) U.S. Cl.
CPC ................................... B60C 25/145 (2013.01)

(58) Field of Classification Search
USPC ........... 251/33, 34, 35, 36, 37, 38, 39, 40, 41, 251/42, 43, 44, 45, 46; 92/162 R; 141/38; 157/1.1, 1.17
See application file for complete search history.

(56) References Cited

U.S. PATENT DOCUMENTS

| | | |
|---|---|---|
| 1,459,775 A | 6/1923 | Larnner |
| 1,516,483 A | 11/1924 | Krafft |
| 2,441,186 A | 5/1948 | Cooper |
| 2,495,829 A | 1/1950 | Vincent |
| 2,515,068 A | 7/1950 | Young |
| 2,634,717 A | 4/1953 | Junkin |
| 2,841,359 A | 7/1958 | Berk |
| 2,919,714 A | 1/1960 | Mrazek |
| 2,972,998 A | 2/1961 | Detwiler |
| 3,101,733 A | 8/1963 | Lord |
| 3,297,047 A | 1/1967 | Sime |
| 3,380,469 A | 4/1968 | Salerno et al. |
| 3,399,689 A | 9/1968 | Keane |
| 3,415,269 A | 12/1968 | Salerno |
| 3,566,907 A * | 3/1971 | Sime et al. ..................... 137/219 |
| 3,580,274 A | 5/1971 | Hansen |
| 3,680,540 A | 8/1972 | Stengl |
| 3,742,968 A | 7/1973 | Kennedy |
| 3,788,400 A | 1/1974 | Tufts |
| 3,788,527 A | 1/1974 | Matson |
| 3,866,654 A | 2/1975 | Duquesne |
| 3,913,604 A | 10/1975 | Hanson |
| 3,915,339 A | 10/1975 | Matson |

(Continued)

FOREIGN PATENT DOCUMENTS

EP   0408921 A1   1/1991

OTHER PUBLICATIONS

Principle of the Axial Valve, unknown publication date, downloaded from http://www.duncanrogers.com/literature/axialvalve.pdf on about Jan. 25, 2011.

(Continued)

*Primary Examiner* — William McCalister
(74) *Attorney, Agent, or Firm* — Brevetto Law Group

(57) ABSTRACT

A pneumatically operated gas valve includes a piston positioned in a cylinder with one closed end so that the piston may seat against a gas outlet to close the gas valve. A control reservoir may be formed in the cylinder between the piston and the closed end of the cylinder. Means for filling the control reservoir with gas to a control pressure may be provided so that the control pressure acting against the piston may close the gas valve. A release valve may be opened to allow the gas in the control reservoir to escape through an exhaust port to open the gas valve.

20 Claims, 10 Drawing Sheets

(56) References Cited

U.S. PATENT DOCUMENTS

| | | |
|---|---|---|
| 3,971,412 A | 7/1976 | Wierzbicki |
| 3,977,423 A | 8/1976 | Clayton |
| 4,026,327 A | 5/1977 | Deinlein-Kalb |
| 4,234,009 A | 11/1980 | Fuchs |
| 4,285,495 A | 8/1981 | King |
| 4,589,496 A | 5/1986 | Rozniecki |
| 4,615,356 A | 10/1986 | Reip |
| 4,676,402 A | 6/1987 | Stetson |
| 4,732,189 A | 3/1988 | Jones et al. |
| 4,767,024 A | 8/1988 | Rappen |
| 4,817,821 A | 4/1989 | Simoens |
| 5,042,547 A | 8/1991 | Van De Sype |
| 5,072,764 A | 12/1991 | Ochoa |
| 5,143,256 A | 9/1992 | Wadensten |
| 5,168,911 A | 12/1992 | Gottschalk |
| 5,456,302 A | 10/1995 | Demers |
| 5,487,527 A | 1/1996 | Eggleston |
| 5,842,501 A | 12/1998 | Powell |
| 5,853,160 A | 12/1998 | Hurdis |
| 6,161,570 A | 12/2000 | McNeely |
| 6,179,033 B1 | 1/2001 | Demers |
| 6,318,406 B1 | 11/2001 | Conley |
| 6,536,533 B2 | 3/2003 | Reilly |
| 6,601,780 B1 | 8/2003 | Sheng |
| 6,708,771 B2 | 3/2004 | Reilly |
| 6,708,772 B2 | 3/2004 | Bermes |
| 6,726,059 B2 | 4/2004 | Treat |
| 6,925,997 B2 | 8/2005 | Sheng |
| 6,981,842 B2 | 1/2006 | D'Angelo et al. |
| 7,395,749 B2 * | 7/2008 | Adams .................... 92/85 B |
| 7,527,049 B2 | 5/2009 | Sheng |
| 7,866,308 B2 | 1/2011 | Jones |
| 8,261,728 B1 | 9/2012 | Tseng |
| 8,561,711 B2 | 10/2013 | Karalis |
| 2002/0134365 A1 | 9/2002 | Gray |
| 2003/0005918 A1 | 1/2003 | Jones |
| 2003/0178151 A1 | 9/2003 | Ritchie et al. |
| 2005/0183711 A1 | 8/2005 | Eichner |
| 2005/0188977 A1 | 9/2005 | Wygant |
| 2006/0169265 A1 | 8/2006 | Lai |
| 2007/0028909 A1 | 2/2007 | Wood |
| 2008/0011283 A1 | 1/2008 | Lai |
| 2009/0178660 A1 | 7/2009 | Huang |
| 2010/0199961 A1 | 8/2010 | Liao |
| 2011/0120437 A1 | 5/2011 | Tippmann |
| 2011/0253318 A1 | 10/2011 | Kunau |
| 2012/0192707 A1 | 8/2012 | Rogers |
| 2012/0192847 A1 | 8/2012 | Hague |
| 2012/0318251 A1 | 12/2012 | Tseng |
| 2013/0104868 A1 | 5/2013 | Sikes |
| 2013/0239937 A1 | 9/2013 | Macri et al. |

OTHER PUBLICATIONS

The DANFLO Family of Control Valves, Nov. 2009, downloaded from http://www.mandjvalve.com/literature/MJ-1690_DANFLOfamily_mj.pdf on about Jan. 25, 2011.

Pneumatically Operated Deluge Valve model 116FC, Mar. 16, 1999, downloaded from http://www.controlvalves.com/valveFiles/sWJNy-DGVpx-KNIGW-116FC_OM_with_sizes.PDF on about Jan. 25, 2011.

Unknown Author; "The Bead Seater" sales brochure; marketing info published by Astra Mfg. Inc., Manchester, N.H.; 2001.

\* cited by examiner

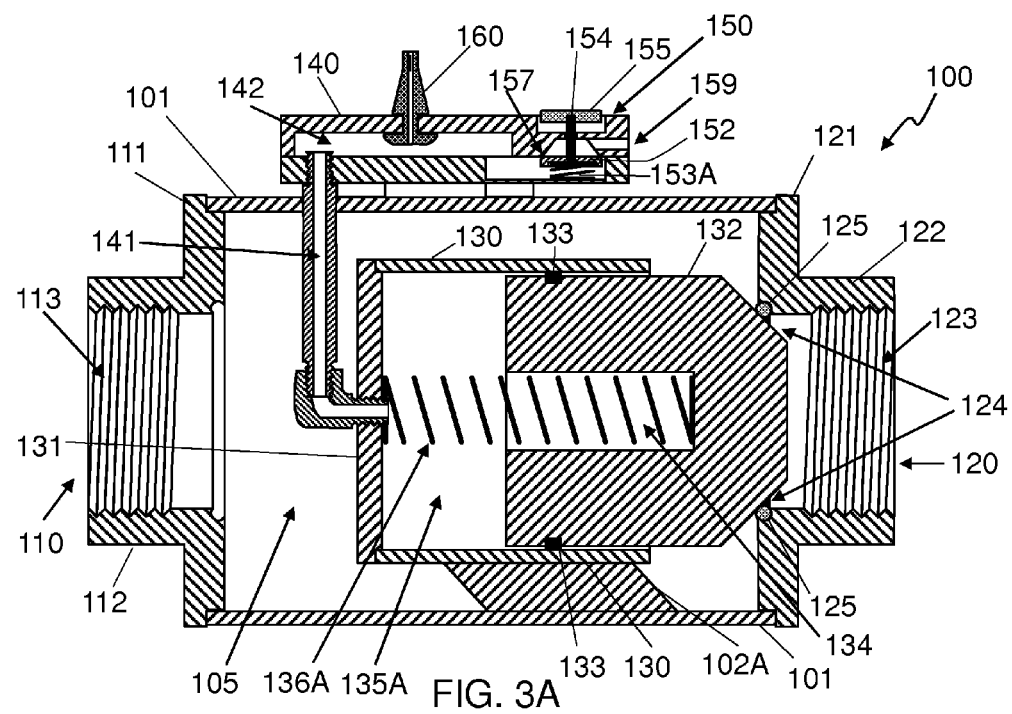
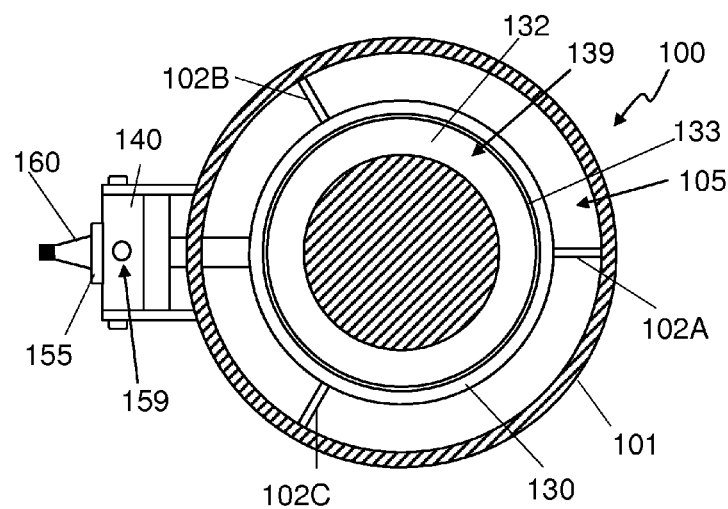
FIG. 3A
FIG. 3B

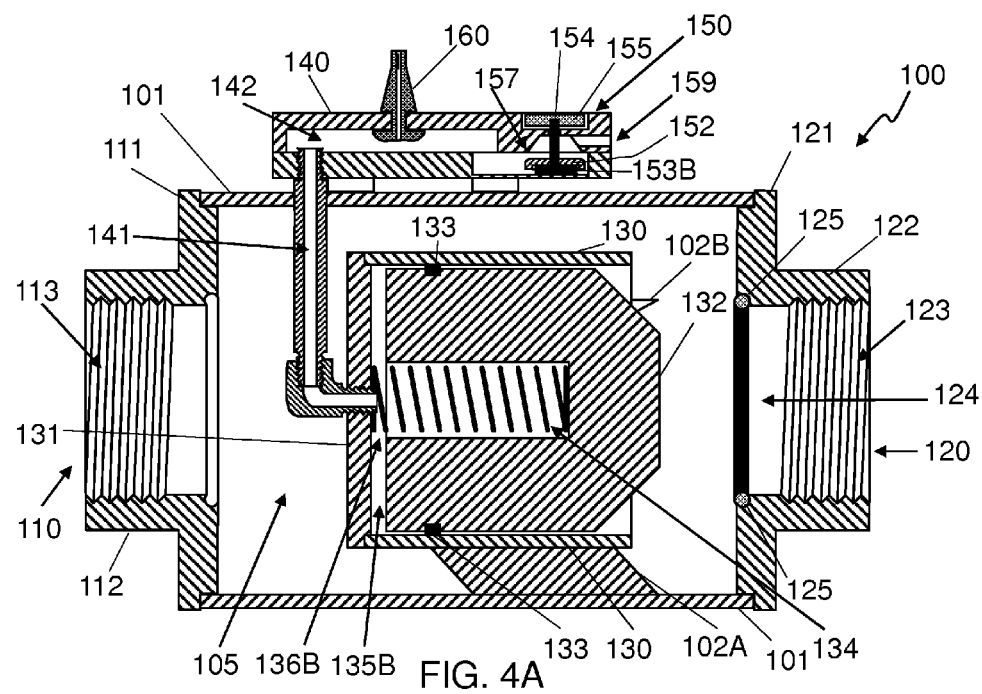
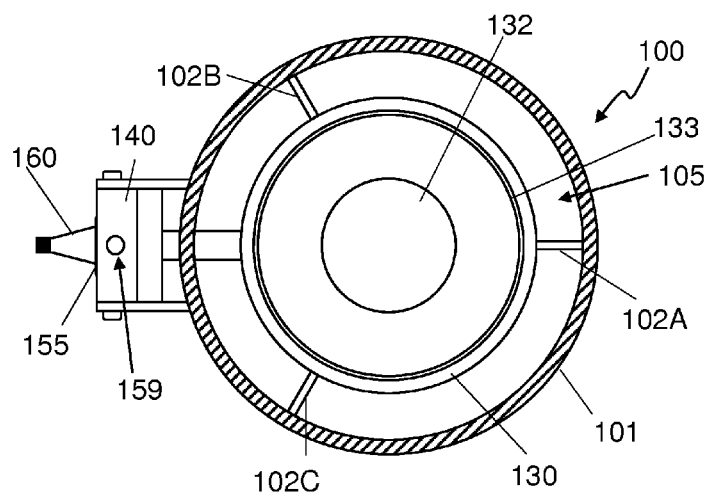

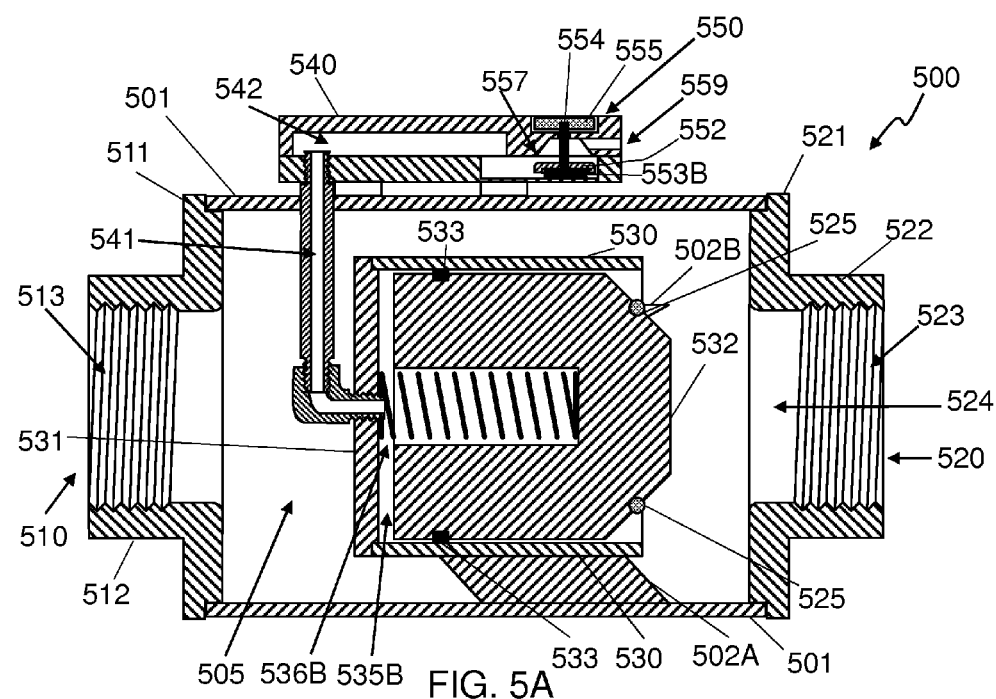
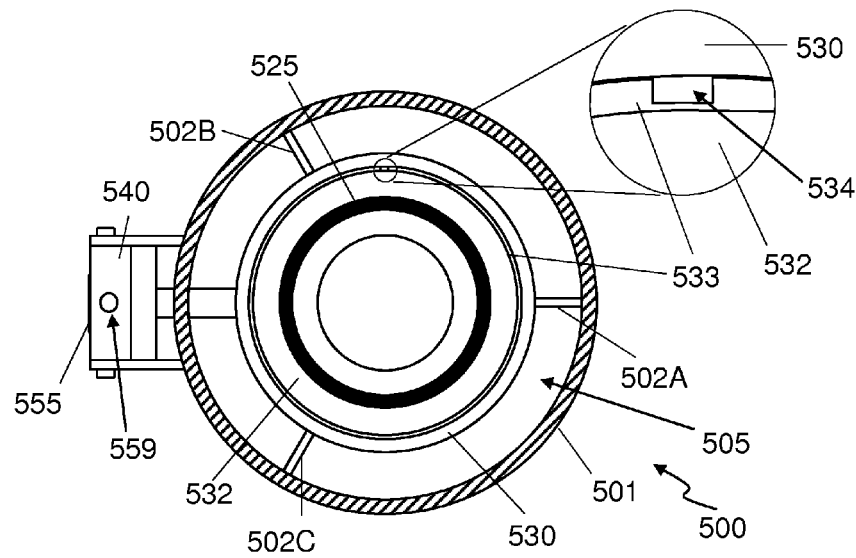

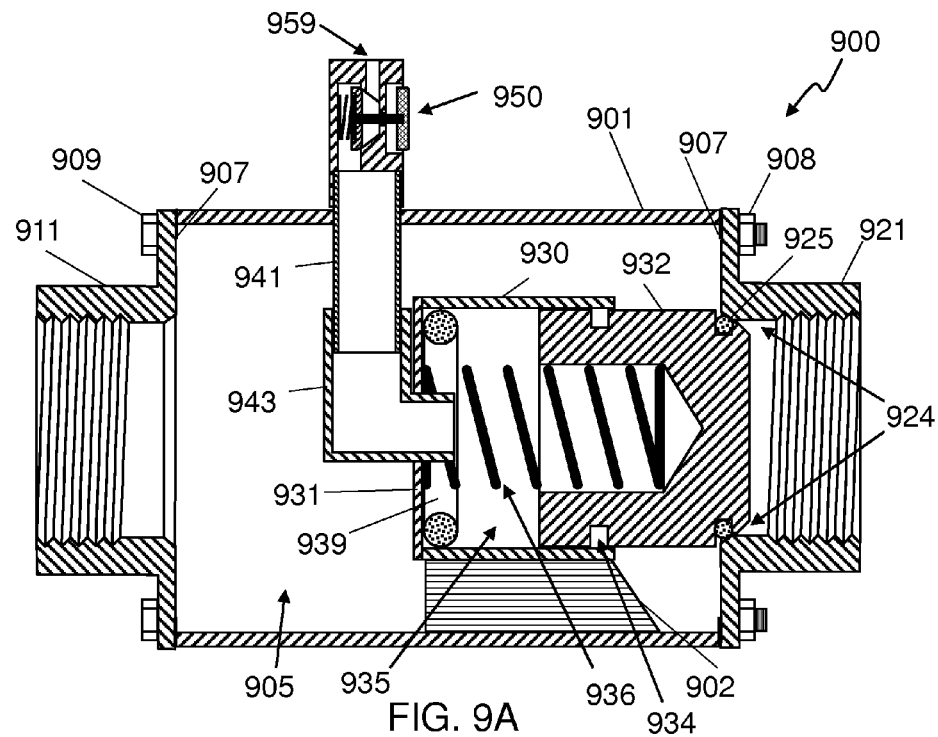
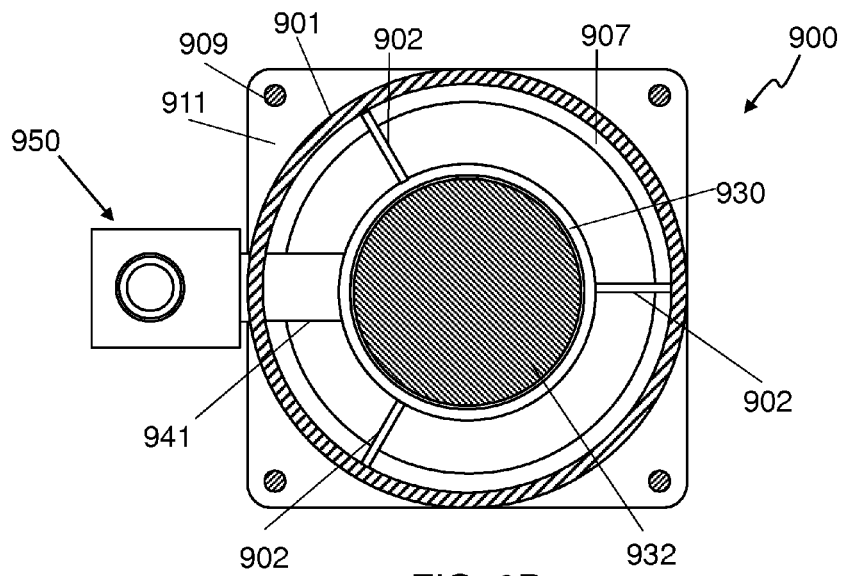

_US 9,033,306 B2_

RAPID OPENING GAS VALVE

BACKGROUND

1. Technical Field

The present subject matter relates to valves. More specifically, the present subject matter relates to a pneumatically controlled, rapid-opening, gas valve.

2. Description of Related Art

Many types of valves suitable for controlling a flow of a gas are known in the art. Common types of gas valves mechanisms include ball valves, butterfly valves, and poppet valves. Gas valves may be actuated manually, electrically, or pneumatically. Some valves allow fine control of the flow of gas and others may simply have an open and a closed position. Some applications, such as for a bead seating tool used to seat a tubeless tire on a rim, require a rapidly opening valve to provide a burst of air. Valves designed to provide a fine control of gas flow are not suitable for such applications requiring a large burst of air.

One conventional design for a rapidly opening gas valve is the butterfly valve. Conventional butterfly valves hold pressurized gas in a tank until the butterfly valve is opened, allowing a burst of pressurized gas to escape from the tank. However, the design of conventional butterfly valves suffers from limitation in the speed with which the butterfly valve can be opened, allowing the pressurized gas from a tank to escape.

SUMMARY

Various embodiments disclosed herein provide improved configurations for a rapidly opening gas valve that differs from conventional gas valve designs.

According to various embodiments, a method for quickly releasing pressurized gas through an outlet may include filling a control reservoir with pressurized gas to slide a piston located in a cylinder against a primary outlet to block primary gas from flowing through the primary outlet. The control reservoir is formed within the cylinder between the piston and a closed end of the cylinder and the gas in the control reservoir has a control pressure. Gas may be provided into a primary gas reservoir and pressurized to a primary pressure. The primary outlet is a path for the pressurized primary gas to escape from the primary gas reservoir. The pressurized gas may be released from the control reservoir through a release valve to allow the control pressure to drop below a release pressure. The release pressure is based on the primary pressure and a difference in area between an area of the primary outlet and a cross-sectional area of the piston. If the control pressure drops below the release pressure, the piston quickly slides away from the primary outlet allowing the primary gas to escape through the primary outlet.

A gas valve may have various embodiments that include a primary gas reservoir having a primary gas outlet with an outlet area. A receptacle with one closed end is fixedly positioned inside the primary gas reservoir. A piston positioned in the receptacle is shaped to fit in the receptacle and has a cross-sectional area greater than the outlet area of the primary gas outlet. The piston is able to slide in a reciprocating motion in the receptacle and a control reservoir is created in the receptacle between the closed end of the receptacle and the piston. The volume of the control reservoir is dependent on a position of the piston in the receptacle. Means for filling the control reservoir with control gas to a control pressure and a release valve is also included. The input of a release valve is pneumatically coupled to the control reservoir. If the control pressure of the control reservoir is greater than a release pressure, the piston is seated against the primary gas outlet, blocking gas from leaving the primary gas reservoir. The release pressure is dependent on a primary pressure of the gas in the primary gas reservoir and a difference in area between the outlet area and the cross-sectional area of the piston. If the release valve is opened and the gas in the control reservoir escapes through the outlet of the release valve causing the control pressure of the gas remaining in the control reservoir to drop below the release pressure, the piston quickly slides into the receptacle, away from the primary gas outlet, allowing the gas in the primary gas reservoir to flow through the primary gas outlet.

BRIEF DESCRIPTION OF THE DRAWINGS

The accompanying drawings, which are incorporated in and constitute part of the specification, illustrate various embodiments of the invention. Together with the general description, the drawings serve to explain the principles of the invention. They should not, however, be taken to limit the invention to the specific embodiment(s) described, but are for explanation and understanding only. In the drawings:

FIG. 3A shows a cross-sectional side view of the gas valve of FIG. 1 in a closed position;

FIG. 3B shows a cross-sectional front view of the gas valve of FIG. 1 in a closed position;

FIG. 4A shows a cross-sectional side view of the gas valve of FIG. 1 in an open position;

FIG. 4B shows a cross-sectional front view of the gas valve of FIG. 1 in an open position;

FIG. 5A shows a cross-sectional side view of an alternate embodiment of a gas valve in an open position;

FIG. 5B shows a cross-sectional front view of the alternate embodiment of a gas valve in an open position;

FIG. 9A shows a cross-sectional side view of a different alternate embodiment of a gas valve in a closed position;

FIG. 9B shows a cross-sectional front view of the different alternate embodiment of a gas valve in a closed position;

DETAILED DESCRIPTION

The present inventor recognized a problem with conventional design. Namely, the conventional designs of bead seating tools feature a tank size that is either too large (for sufficient air volume) or too heavily reinforced (for sufficient pressure) to be conveniently used in order to attain a burst of air sufficient to mount a tubeless tire on a wheel rim. The inventor recognized that by having a simple valve that could open more quickly than conventional ball valves or butterfly valves of conventional designs, a smaller, more easily portable tank might be used. The present invention provides a simple, low cost, pneumatically controlled, rapid-opening, gas valve that may be used for a bead seating tool or other applications. In this way, valves according to the various embodiments disclosed herein can be used with smaller, more easily portable, sized tanks.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures and components have been described at a relatively high-level, without detail, in order to avoid unnecessarily obscuring aspects of the present concepts. A number of descriptive terms and phrases are used in describing the various embodiments of this disclosure. These descriptive terms and phrases are used to convey a generally agreed upon meaning to those skilled in the art unless a different definition is given in this specification. Reference now is made in detail to the examples illustrated in the accompanying drawings and discussed below.

FIGS. 1, 2, 3A, 3B, 4A, and 4B all show the same embodiment of a pneumatically controlled, rapid-opening, gas valve 100. Therefore, the same reference numbers are used throughout these drawings and reference may be made to the various drawings in the description.

Figure 1:
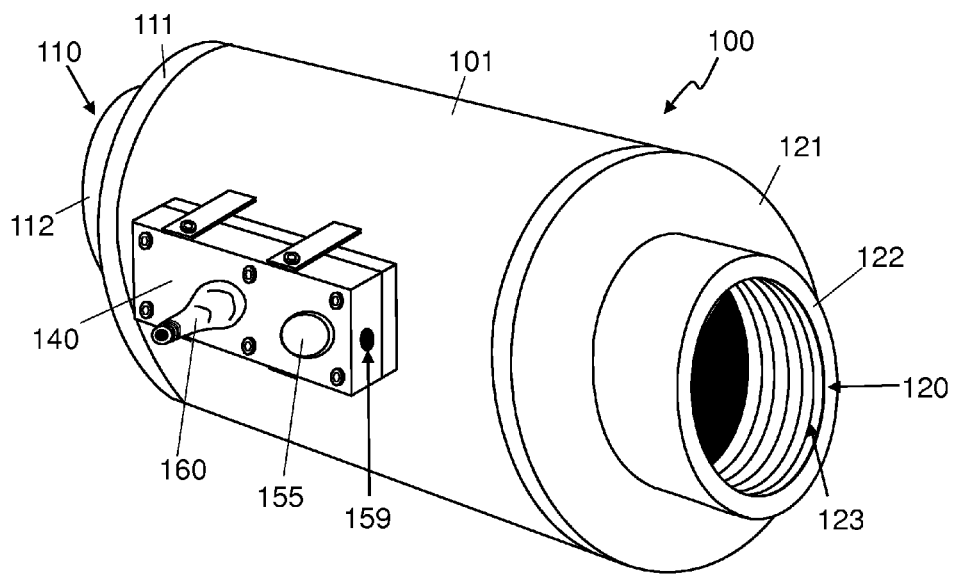
FIG. 1 shows an isometric view of an embodiment of a pneumatically controlled, rapid-opening, gas valve.
Figure 2:
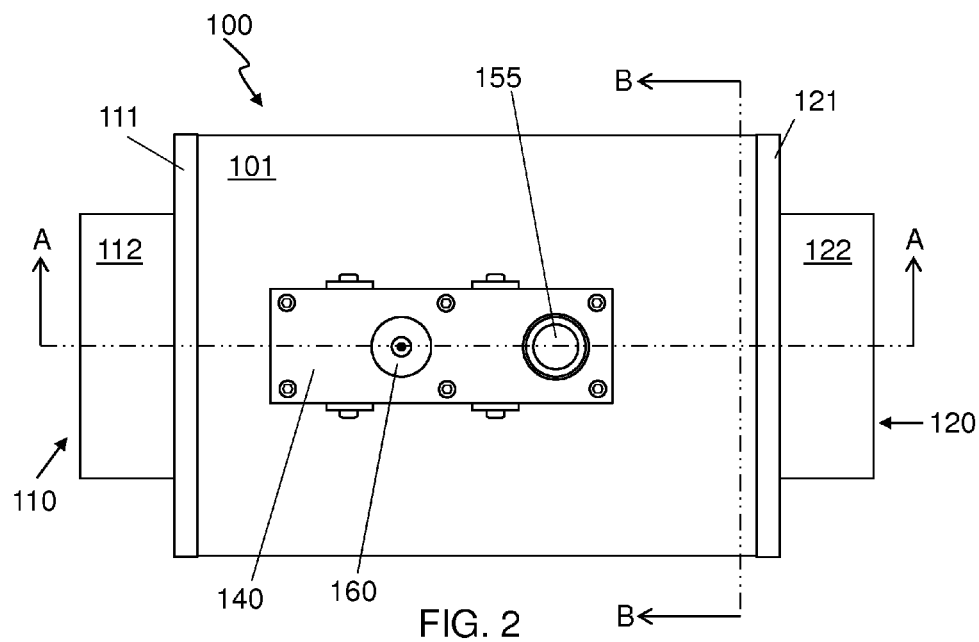
FIG. 2 shows a top plan view of the gas valve of FIG. 1.

FIG. 1 shows an isometric view and FIG. 2 shows top plan view of an embodiment of the gas valve 100. The gas valve 100 may have a cylindrical body 101 with two end-caps 111, 121 attached to the body 101 to form a primary gas reservoir 105. In other embodiments, the primary gas reservoir 105 may be formed with other configurations of parts and may have other shapes such as spherical, cubic, conical, or other volumetric shapes. In the embodiment shown, the end caps 111, 121 and the body 101 may be made of steel, aluminum, a polymer such as poly-vinyl chloride (PVC) plastic, polycarbonate plastic such as Lexan® from SABIC Innovative Plastics, acrylonitrile butadiene styrene (ABS) plastic, or other suitable materials, depending on the targeted operating pressure, size, shape, weight, cost, or other design parameters of a particular embodiment. The end caps 111, 121 may be attached to the body 101 using a method appropriate for the material used, including, but not limited to, welding, gluing, screw-threads, bolts, external clamps, or other methods to create a gas-tight seal.

The input end cap 111 may have a primary gas input opening 110 formed by an input fitting 112 with threads 113 to accept gas into the primary gas reservoir 105 from an external source that may be connected to the input fitting 112. The input source may be connected to the gas valve 100 using other types of connections in some embodiments including, but not limited to, a quick-connect fitting, a sleeve fitting, or other type of connection that may be held in place with screw threads, glue, a bayonet type mount, a quick-connect, welds, friction, or other methods that allow a gas-tight, or nearly gas-tight, seal to be formed as the primary gas reservoir is pressurized. The output end cap 121 may have a primary gas outlet opening 120 formed by an output fitting 122 with threads 123. An output conduit may be connected to the output fitting 122 using the threads 123 or other types of connection as described above for the input fitting 112.

A control block 140 may be attached to the body 101 by bolts, welding, gluing or other attachment methods. A fill valve 160, a Schrader valve in the embodiment shown, may extend from the control block 140. A release valve button 155 may also be accessible and an exhaust port 159 may also be seen on one end of the control block 140. In some embodiments the control block 140 may be located away from the valve body 101 in order to control the valve from a distance. In such embodiments the control block 140 is connected to the valve by the conduit 141 which is configured to extend away from body 101.

FIG. 2 also shows two cross-sectional cutting planes. Cross-sectional cutting plane A:A shows the approximate position of the plane used for the cross-sectional views of FIGS. 3A and 4A. The cross-sectional views of FIGS. 5A, 6, 7, 8 and 9A are from a similarly positioned cutting plane in their associated embodiment. Cross-sectional cutting plane B:B shows the approximate position of the plane used for the cross-sectional views of FIGS. 3B and 4B and the cross-sectional view of FIG. 5B and are from a similarly positioned cutting plane in their associated embodiment.

FIG. 3A shows a cross-sectional side view taken from the perspective of cross-sectional cutting plane A:A of FIG. 2. FIG. 3B shows a cross-sectional front view taken from the perspective of cross-sectional cutting plane B:B of FIG. 2. FIG. 3B depicts the gas valve 100 in a closed position. A piston 132 may be seated against the primary gas outlet 124 to block gas from leaving the primary gas reservoir 105 through the primary gas outlet opening 120. A gasket, rubber o-ring 125, or other type of seal may be positioned at the primary gas outlet 124 although other embodiments may position an o-ring on the piston 132 instead. Other embodiments may not require the use of an o-ring 125, depending on the materials used for the piston 132 and the primary gas outlet 124 and manufacturing tolerances of the various parts. The piston 132 may be made of any suitable material including, but not limited to steel, aluminum, PVC, polycarbonate, ABS, and polyacetal polymers such as polyoxymethylene including Delrin® acetal resin from DuPont.

The piston 132 may be shaped to fit into a receptacle 130 with a closed end 131 and slide in a reciprocating motion in the receptacle 130. As can be seen in comparing FIG. 3A and FIG. 3B the piston 132 is configured to slide back and forth within the cylindrical receptacle 130. The device is configured so the chamfered end of piston 132 (i.e., the end opposite spring 136A) can slide beyond the edge of receptacle 130 to press against the rubber o-ring 125 or other seal positioned at the primary gas outlet 124. The other end of piston 132 remains within the cylinder receptacle 130 and is acted upon by the force of the spring 136A and the control pressure within the control reservoir 135A.

The receptacle 130 and piston 132 may be cylindrical in shape with a circular cross-section or in other embodiments may have other cross-sectional shapes such octagonal, square, ellipsoid, or other shapes. The receptacle 130 may be positioned by supports 102A, 102B, 102C to allow the piston 132 to slide into position to seal the primary gas outlet 124. The number of supports may vary between embodiments. The supports 102A, 102B, 102C may be fixed to both the outer wall of the receptacle 130 and the inner wall of the body 101 using welding, glue, bolts, or other attachment mechanisms depending on the materials used and the details of the embodiment. In other embodiments, the supports may be fixed to the outer wall of the receptacle 130 and the output end cap 121. A compressed spring 136A may be positioned between the closed end of the receptacle 131 and the piston 132 to provide force to help keep the piston 132 seated against the primary gas outlet 124. In some embodiments, the piston 132 may have a cavity 134 for positioning the compressed spring 136A and providing room for the spring as the piston 132 moves toward the closed end 131.

The piston 132 may include one or more piston rings 133 that may be fitted around the piston 132 or may be an integral part of the piston 132 and may be interposed between the piston 132 and the receptacle 130 to create a tighter seal than could otherwise be created between the piston 132 and receptacle 130 alone. It may be advantageous in some embodiments to create a tight seal between the receptacle 130 and the piston 132 while still providing for low friction between the receptacle 130 and the piston 132. The piston ring 133 may be made of a material to help minimize the friction and create a good seal such as polyacetal, nylon, leather, rubber, or other material depending on the materials used for the piston 132 and the receptacle 130.

A control reservoir 135A may be created between the closed end 131 of the receptacle 130 and the piston 132. The piston 132 and control reservoir 135A are typically located on the same side of the primary gas outlet opening 120 as the primary gas reservoir 105. As such, the piston 132 may be thought of as holding the valve closed from within the primary gas reservoir 105, rather than from the outside of reservoir 105 (e.g., rather than from outside of primary gas outlet opening 120). The volume of the control reservoir 135A depends on the position of the piston 132 within the receptacle with the largest volume of the control reservoir 135A occurring if the piston 132 is seated against the primary gas outlet 124 as shown in FIG. 3A. A conduit 141 may pneumatically couple the control reservoir 135A and a plenum 142 in the control block 140, allowing gas to flow between the control reservoir 135A and the plenum 142. The conduit 141 may include tubing, pipe, fittings or other hardware. Gas flowing through the conduit 141 should not be considered as flowing though the primary gas reservoir 105 as the conduit 141 creates a separation between the gas in the conduit 141 and the primary gas reservoir 105. The conduit 141 may exit through the body 101. The exit point may be sealed using a rubber seal, gasket, glue, welding or other method so that gas cannot escape from the primary gas reservoir 105 around the conduit 141. The control block 140 may be fabricated differently in various embodiments but one embodiment may fabricate the control block 140 using a top section and a bottom section that are then attached using screws, glue, welding or other methods.

A release valve 150 may be positioned to have an input pneumatically coupled to the control reservoir 135A via the plenum 142 and the conduit 141. The output of the release valve 150 may be pneumatically coupled to the exhaust port 159. The release valve 150 may be a poppet valve as shown or may be any type of gas valve in other embodiments including, but not limited to, a ball valve, a butterfly valve, a diaphragm valve, or other type of valve that may be manually, electrically, pneumatically, hydraulically, or otherwise controlled. The release valve 150 may include a valve body 152 configured to mate with valve seat 157 to form a gas-tight seal. Spring 153A may provide force to keep the valve body 152 seated against the valve seat 157. A rod 154 may connect the valve body 152 to the release button 155.

The fill valve 160, which may also be called a control gas inlet, allows gas from an external source to enter the plenum 140 and flow through the conduit 141 into the control reservoir 135A without first flowing through the primary gas reservoir. As the control reservoir 135A is pressurized to a control pressure, the gas in the control reservoir 135A provides additional force on the piston 132 to push the piston 132 against the primary gas outlet 124. The control reservoir 135A may be filled with gas and pressurized using various methods in various embodiments, some of which are described below.

The gas reservoir of high pressure gas that is released by the valve is, in practice, typically much larger in volume than control reservoir 135A. This may be achieved by connecting primary gas reservoir 105 to a source of pressurized gas via the primary gas input opening 110. The source of pressurized gas may be a tank or other reservoir, or a high pressure gas line, that connects to primary gas reservoir 105 via primary gas input opening 110. Gas may enter the primary gas reservoir 105 using various methods in various embodiments but in the embodiment shown in FIG. 1, the gas may enter through the primary gas input opening 110 to pressurize the primary gas reservoir 105 to a primary pressure. If the gas valve 100 is in the closed state as shown in FIG. 1, in many applications the pressure at the primary gas output opening 120 may typically be at standard atmospheric pressure although in some embodiments, the pressure at the primary gas output opening 120 may be at some other pressure level although the calculations below are based on the pressure at the primary gas outlet opening 120 being at the pressure of the surrounding atmosphere if the gas valve 100 is closed. Other pressure levels are measured with respect to the pressure of the surrounding atmosphere.

The closing forces operating on the piston 132 include the force of the compressed spring 136A and the force of the gas in the control reservoir 135A operating on the piston 132 which is equal to the control pressure times the cross-sectional area of piston 132 at its largest point which will be referred to hereinafter as the piston area. In many embodiments, the piston area may be equal to the cross-sectional area of the piston at the piston ring 133. The opening forces on piston include the force of any pressure at the primary gas outlet opening 120 times the cross-sectional area of the of the primary gas outlet opening 120, hereinafter referred to as the outlet area, and the force of the gas in the primary gas reservoir 105 operating on the piston 132 which is equal to the primary pressure times the difference in the piston area and the outlet area. The area represented by the difference in the piston area and the outlet area can be seen as the annular ring 139 in FIG. 3B.

The gas valve 100 may be opened by opening the release valve 150 by pushing on the release button 155 which uses the rod 154 to move the valve body 152 away from the valve seat 157 which also compresses the spring 153B. Opening the release valve 150 allows the pressurized gas in the control reservoir 135A to pass through the conduit 141, the plenum 142, the open release valve 150, and the exhaust port 159. This may cause the control pressure to drop toward the surrounding atmospheric pressure. As the control pressure drops, the closing force on the piston 132 is reduced. If the control pressure drops to a release pressure, the opening force on the piston 132 may exceed the closing force and the piston 132 may begin to slide within the receptacle 130 and allow gas to escape through the primary gas outlet 124 which may increase the pressure at the primary gas outlet 124. This increases the opening force on the piston 132 and even though the control reservoir 135A is being made smaller and the compressed spring 136A is being further compressed, both of which may increase the closing force on the piston 132, the increased opening force overcomes the closing force and the piston 132 slides rapidly into the receptacle, quickly opening the gas valve 100. In the inventor's estimation, many embodiments may open in less than 0.10 seconds (s) and some embodiments may open in a few tens of milliseconds (ms) such as 20-50 ms although other embodiments may open even faster and some may open more slowly than 0.10 s.

Referring now to FIGS. 4A and 4B which show cross sectional views of the gas valve 100 in an open position, the piston 132 has slid into the receptacle 130 to allow the gas to escape through the primary gas outlet 124. As long as the release valve 150 is held open with enough force to overcome the closing force of the spring 153B, the control reservoir 135B, now much smaller due to the position of the piston 132, may be at or near the pressure of the surrounding atmosphere, so that the only closing force on the piston is from the more compressed spring 136B. As long as enough gas flows into the input gas opening 110 to continue to create enough primary pressure in the primary gas reservoir 105 so that the primary pressure times the piston area is greater than force from the more compressed spring 136B, the gas valve 100 will tend to remain open.

The gas valve 100 may be closed in two ways. If the gas entering the gas valve 100 through the primary gas input 110 is reduced or shut off, the primary pressure in primary gas reservoir 105 is reduced and the force from the spring 135B (which is compressed when the valve is open) will tend to push the piston against the primary gas outlet 124, closing the gas valve 100. The closure of the gas valve 100 due to pressure of spring 135B when the pressure within primary gas reservoir 105 falls to a sufficiently low level can occur independent of the position of the release valve 150—that is, with the release valve 150 open or closed, depending upon the pressure in reservoir 105. The second manner of the release valve 150 being closed involves gas being provided to pressurize the control reservoir 135B to a point that the control pressure provides enough closing force on the piston 132 to overcome the opening force from the primary pressure. This causes the piston 132 to slide shut and push against the primary gas outlet 124, closing the gas valve 100. These two forces—the force of spring 135B and the force due to the pressure in control reservoir 135B—may act together in closing the valve.

The gas valve 100 may be built with various dimensions in various embodiments designed for use in different applications. In one embodiment, the input fitting 112 and output fitting 122 may be designed to mate with 1.5 inch (in.) threaded pipes. The inside diameter of the cylindrical receptacle 130 may be in a range from 1.6 in. to over 2.25 In. with one embodiment using a cylinder with an inside diameter of about 1.8 in. for the receptacle. Based on the inventor's experiments, if the area of the inside of the receptacle 130 is at least 10% larger than the area of the primary gas outlet 124, the gas valve 100 operates well. Other embodiments may use a wide range of sizes for the primary gas outlet 124 and for the receptacle 130, for example, in some embodiments the receptacle 130 size may vary within the range of 0.25 inch to 12 inches, with correspondingly sized inputs, outputs and fittings. In yet other embodiments the size of the body 101 can be any size as long as enough space is left between the receptacle 130 and the body 101 for the free flow of gas but in one embodiment, the body 101 is a cylinder about 4 in. in diameter. The conduit 141 may be of various sizes but some embodiments may use a ⅛ in. and others may use ¼ in. pipe and fittings. Other embodiments may use larger pipes or tubes with various fittings.

Some applications of the gas valve 100 are for use with compressed air at up to about 150 pounds per square inch (psi). So some embodiments may be designed for use at up to 150 psi of pressure in the primary gas reservoir 105. Other embodiments may be designed for use at lower pressures, such as under 100 psi or under 50 psi. Some embodiments may be designed for use with gas at low temperatures, such as under 100 degrees Celsius (C). Other embodiments may be designed for use at much lower or much higher temperatures. The intended operating temperature may impact the choice of materials and construction techniques used.

FIG. 5A shows a cross-sectional side view, and FIG. 5B shows a cross-sectional front view of an alternate embodiment of a gas valve 500 in an open position. The embodiment shown in FIGS. 5A and 5B is quite similar to the gas valve 100 discussed above and may use similar materials and constructions techniques. The gas valve 500 may have a cylindrical body 501 with two end-caps 511, 521 attached to the body 501 to form a primary gas reservoir 505. The input end cap 511 may have a primary gas input opening 510 formed by an input fitting 512 with threads 513 to accept gas into the primary gas reservoir 505 from an external source that may be connected to the input fitting 512. The output end cap 521 may have a primary gas outlet opening 520 formed by an output fitting 522 with threads 523. An output pipe may be connected to the output fitting 522 using the threads 523 or other types of connection.

A piston 532 may be shaped to fit into a cylinder 530 with a closed end 531 and slide in a reciprocating motion in the cylinder 530. The cylinder 530 may be positioned by supports 502A, 502B, 502C to allow the piston 532 to slide into position to seal the primary gas outlet 524. A compressed spring 536B may be positioned between the closed end of the cylinder 531 and the piston 532 to provide force to help keep the piston 532 seated against the primary gas outlet 524. A gasket or o-ring 525 may be positioned on the piston 532 to better seal against the primary gas outlet 524 if the gas valve 500 is closed.

The piston 532 may include one or more piston rings 533 that may be fitted around the piston 532 or may be an integral part of the piston 532 and may be interposed between the piston 532 and the cylinder 530. The piston ring 533 of the embodiment shown may have one or more notches 534 configured to allow for a controlled flow of gas between the primary gas reservoir 505 and the control reservoir 535B that may be created in the cylinder 530 between the closed end 531 of the cylinder 530 and the piston 532. Other embodiments may use a piston ring 533 that has been cut and is sized such that if it is positioned on the piston 532, a gap is left between the two ends of the cut piston ring 533.

A control block 540 may be attached to the body 501. A conduit 541 may pneumatically couple the control reservoir 535B and a plenum 542 in the control block 540, allowing gas to flow between the control reservoir 535B and the plenum 542. A release valve 550 may be positioned in the control block 540 to have an input pneumatically coupled to the control reservoir 535B via the plenum 542 and the conduit 541. The output of the release valve 550 may be pneumatically coupled to the exhaust port 559. The release valve 550 may include a valve body 552 configured to mate with valve seat 557 to form a gas-tight seal. A rod 554 may connect the valve body 152 to the release button 155. If primary pressure is maintained by having gas flow into the primary gas reservoir 505 from the gas input opening 510, then as long as the release button 555 is pressed, gas is free to flow from the control reservoir 535B out of the exhaust port 559, keeping the control reservoir 535B at a low pressure so that the gas valve 500 remains open.

If pressure holding the release button 555 down is removed, spring 553B may provide force to push the valve body 552 against the valve seat 557 and blocking the flow of gas out of the exhaust port 559. If this occurs, gas may flow from the primary gas reservoir 505, though the one or more gaps 534 in the piston ring 533 and eventually pressuring the control reservoir 535B to a control pressure approaching the primary pressure. As this occurs, the closing force on the piston 532 may eventually exceed the opening force due to the force from the compressed spring 536B, and the piston 532 may slide against the primary gas outlet 524, closing the gas valve 500.

By using one or more small gaps 534 in the piston ring 533, gas may flow from the primary gas reservoir 505 to fill the control reservoir 535B. But the small size of the gaps 534 may not allow the gas to flow fast enough to equalize the pressure between the primary gas reservoir 505 and the control reservoir 535B. The pressure differential created allows the closing force and opening forces on the piston 532 to work as described above.

In the embodiment shown, some gas may flow from the primary gas reservoir 505, through the gap 534, the control reservoir 535B, the conduit 541, the plenum 542, the release valve 550 and out the exhaust port 559 while the release valve 550 is held open. This may be fine for some applications while other applications may not tolerate that type of gas leakage.

The size and number of gap 534 required may depend on several factors including, for example, the rate of increase of the pressure in the primary gas reservoir 505, the maximum volume of the control reservoir 535 and the fit of the piston 532 in the cylinder. It is expected that for some of the applications envisioned by the inventor, one gap 534 about 0.25 inch wide and about 0.05 inches deep should allow the gas valve 500 to operate properly. Other applications may utilize a different number and/or size of gap 534 in the piston ring 533.

In another embodiment of gas valve 500, the input fitting 512 and threads 513 may be designed to mate with a standard carbon-dioxide ($CO_2$) tank with a CGA320 fitting that may contain $CO_2$ at 800 psi or more. In the embodiment using $CO_2$, the primary gas outlet 524 may have a diameter of 0.47 in. and the cylinder 530 may have an inside diameter of 0.61 in with the body 501 having a 2 in. diameter and a 0.095 wall thickness. Other embodiments may use different dimensions depending on the gas and pressure used as well as the specifics of the application. Some embodiments may be designed for use with nitrogen, helium, air or other gases at pressures ranging from a few psi to several thousand psi.

Figure 6:
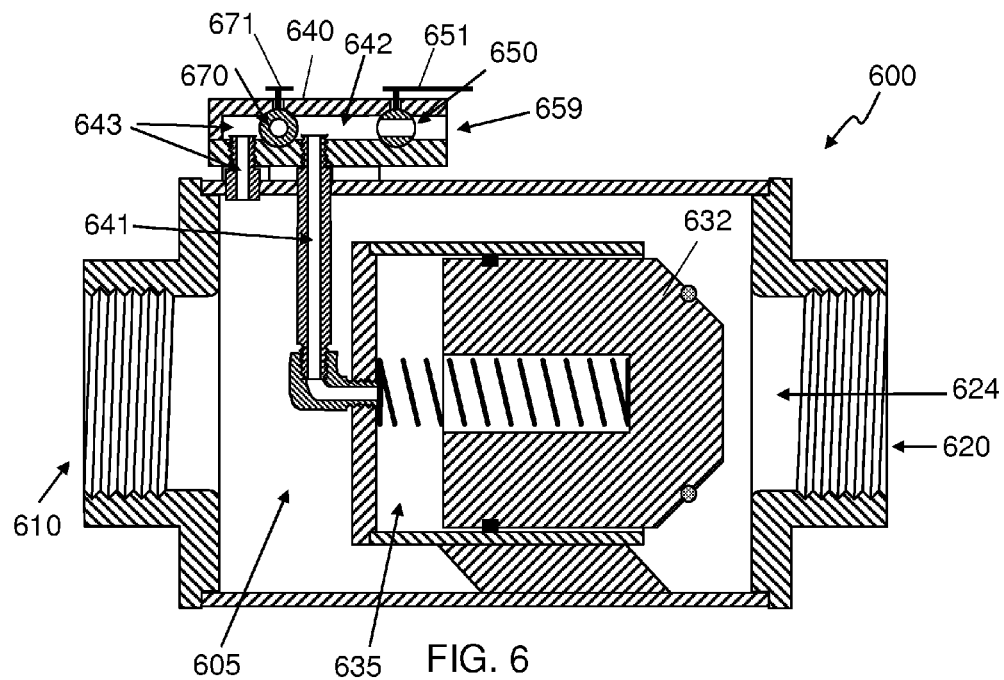
FIG. 6 shows a cross-sectional side view of another alternate embodiment of a gas valve in a partially open position.

FIG. 6 shows a cross-sectional side view of another alternate embodiment of a gas valve 600 in a partially open position. Due to the similarities of this embodiment with the previously described embodiments, some of the details of the construction for this embodiment are not discussed here. The gas valve 600 includes a gas input opening 610 and a gas output opening 620 with a primary gas outlet 624. A piston 632 may be positioned to slide into position to seat against the primary gas outlet 624, closing the gas valve 600 and blocking the flow of gas from the primary gas reservoir 605 through the gas output opening 620.

A control block 640 may have a primary gas tap 643 allowing gas from the primary gas reservoir 605 to flow into the control block 640. A fill valve 670, which a ball valve in this embodiment but could be any type of suitable valve in other embodiments, may be controlled by a fill handle 671. If the fill valve 670 is open, gas may flow from the primary gas reservoir 605, through the primary gas tap 643 into the plenum 642 which is pneumatically coupled to the control reservoir 635 and to the input of the release valve 650. The release valve 650 is ball valve in this embodiment but could be any type of suitable valve in other embodiments. The release valve 650 may be controlled using the release handle 651 and if the release valve 650 is open, gas may flow from the plenum 642 out of the exhaust port 659.

To close the gas valve 600, the release valve 650 may be closed and the fill valve 670 may be opened, allowing gas to flow from the primary gas reservoir 605, through the primary gas tap 643, through the fill valve 670, the plenum 642 and the conduit 641 into the control reservoir 635. As the pressure in the control reservoir 635 increases and begins to approach the pressure in the primary gas reservoir 605, the force of the spring 636 pushes the piston 632 to seat against the primary gas outlet 624 closing the gas valve 600.

To open the gas valve 600, the fill valve 670 may be closed and the release valve 650 opened allowing gas to flow from the control reservoir 635, though the conduit 641, the plenum 642 the release valve 650 and out the exhaust port 659. As the pressure in the control reservoir 635 begins to drop toward the pressure of the surrounding atmosphere, the opening force on the piston 632 due to the pressure of the primary gas reservoir 605 acting on the area of the piston 632 exposed to the primary gas reservoir 605, may overcome the closing force on the piston 632 due to force of the spring 636 and the pressure of the control reservoir 635 acting on the entire area of the piston 632 exposed to the control reservoir 635, thereby opening the gas valve 600. FIG. 6 shows the gas valve 600 in the process of opening soon after the release valve 650 is opened.

Figure 7:
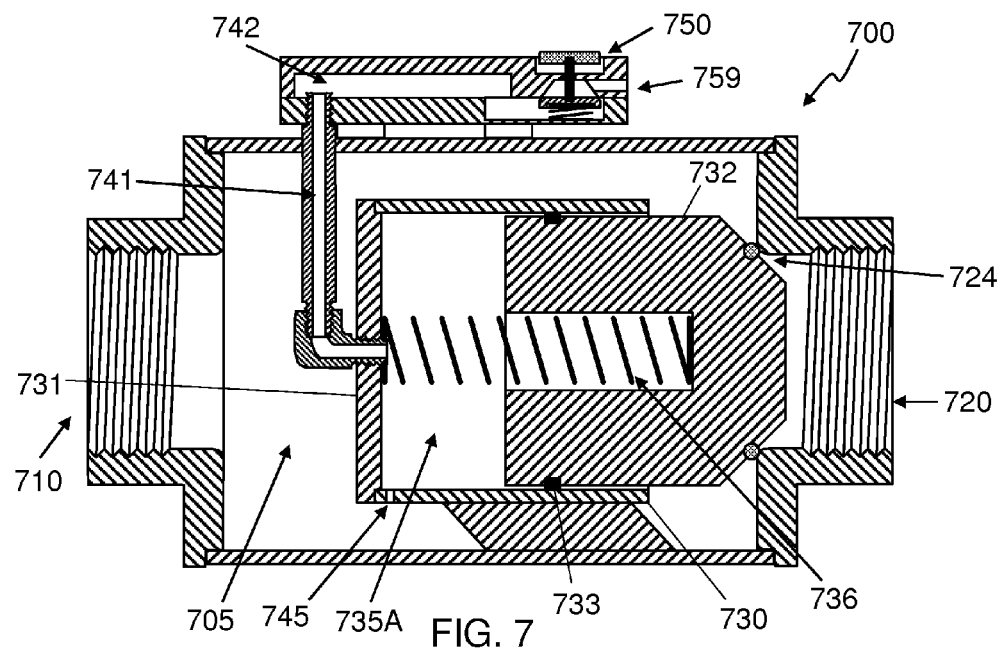
FIG. 7 shows a cross-sectional side view of yet another alternate embodiment of a gas valve in a closed position.

FIG. 7 shows a cross-sectional side view of yet another alternate embodiment of a gas valve 700 in a closed position. Due to the similarities of this embodiment with the previously described embodiments, some of the details of the construction for this embodiment are not discussed here. The gas valve 700 includes a gas input opening 710 and a gas output opening 720 with a primary gas outlet 724. A cylinder 730 with a closed end 731 may be positioned so that a piston 732 sliding in the cylinder 730 may slide against the primary gas outlet 724, closing the gas valve 700 and blocking the flow of gas from the primary gas reservoir 705 through the gas output 720.

A control reservoir 735A may be pneumatically coupled to the input of a release valve 750 by a conduit 741 and a plenum 742. If the release valve 750 is closed, gas from the primary gas reservoir 705 may enter the control reservoir 735A through one or more small holes 745 in the cylinder 730 which may include the closed end 731 of the cylinder 730. As the pressure in the control reservoir 735A increases and begins to approach the pressure in the primary gas reservoir 705, the force of the spring 736 pushes the piston 732 to seat against the primary gas outlet 724 closing the gas valve 700. If the release valve 750 is opened, gas from the control reservoir 735A may be released through the exhaust port 759. As the pressure in the control reservoir 735A begins to drop toward the pressure of the surrounding atmosphere, the opening force on the piston 732 may overcome the closing force on the piston 732 opening the gas valve 700.

The size and number of the holes 745 in the cylinder 730 may depend on several factors, including expected rate of pressure increase in the primary gas reservoir 705 and the maximum size of the control reservoir. For the application envisioned by the inventor, where the gas output opening is about 1.5 inches in diameter, a hole 745 as small as 1/32 inch in diameter has shown to be adequate for proper operation of the gas valve 700. Other applications may utilize a different number and/or size of hole 745.

Figure 8:
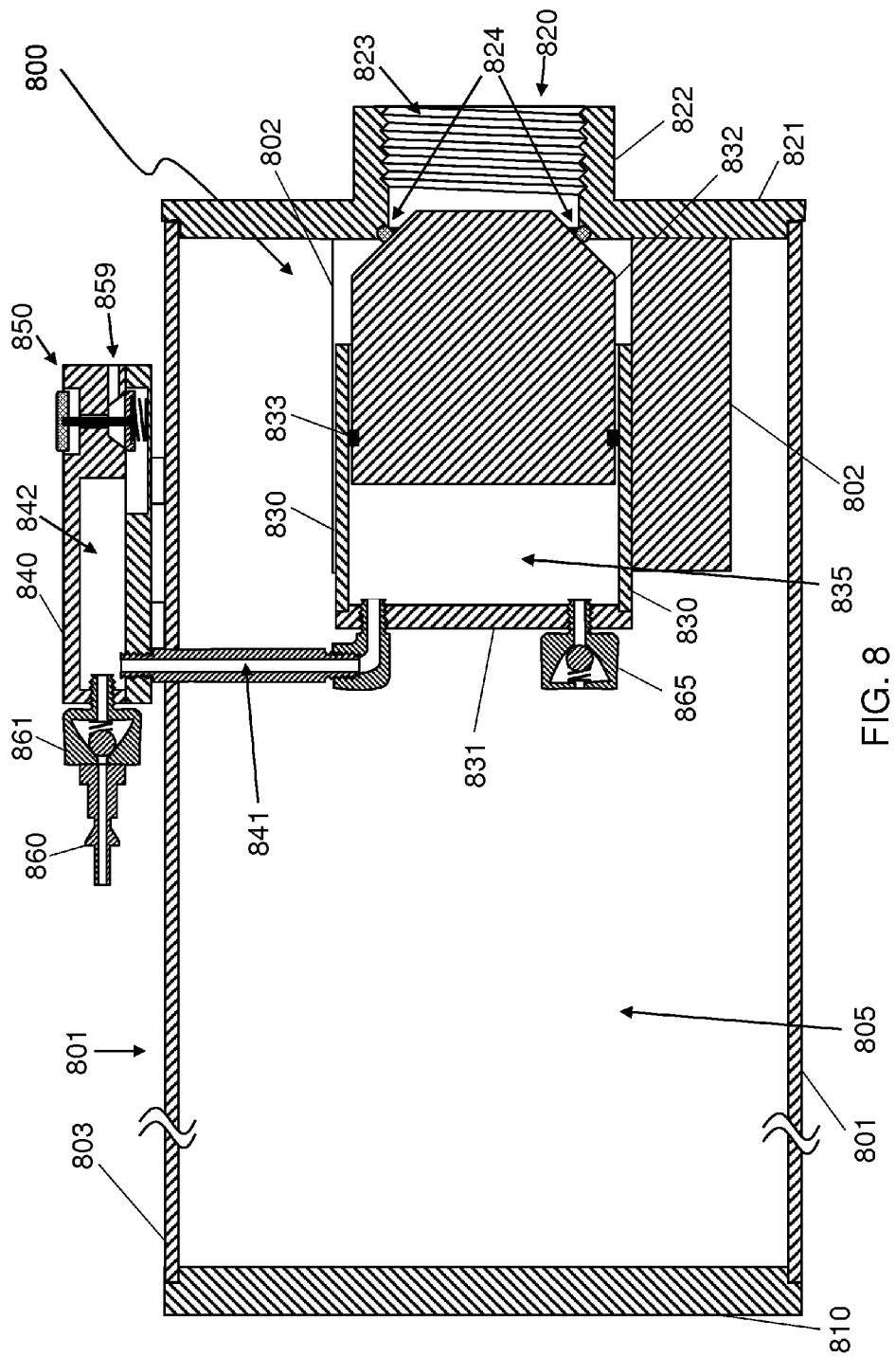
FIG. 8 shows a cross-sectional side view of an embodiment of a gas valve directly positioned in a pressure vessel.

FIG. 8 shows a cross-sectional side view of an alternate embodiment of a gas valve 800 directly positioned in a pressure vessel or tank 801. The tank 801 may be made from a body 803 that may be cylindrical or some other shape, an end cap 810 and an output end cap 821. The output end cap 821 may have an output fitting 822 with threads 823 to provide a primary gas output opening 820. A cylinder 830 with a closed end 831 may be positioned inside the tank 801 using supports 802 that connect the cylinder 830 to the output end cap 821. Any number of supports 802 may be used. The cylinder 830 may be positioned to allow a piston 832 that may slide in a reciprocating motion in the cylinder 830 to push against the primary gas outlet 824 to close the gas valve 800. The piston 832 may include one or more piston rings 833 to provide for a better seal between the piston 832 and the cylinder 830 without increasing the friction too much.

A control body 840 may be mounted on the outside of the tank 801. The control body may have an quick-connect gas fitting 860 with check valve 861 to allow gas to flow from an external gas source that may be connected to the quick-connect gas fitting 860 into the plenum 842 but not allow the gas to escape from the plenum 860 back out through the quick-connect gas fitting 860. The plenum 842 is pneumatically coupled to the input of a release valve 850. The plenum 842 is also pneumatically coupled to a control reservoir 835 formed in the cylinder 830 between the piston 832 and the closed end 831 of the cylinder 830 through a conduit 841. A check valve 865 may allow gas to flow from the control reservoir 835 into the primary gas reservoir 805 but not allow gas to flow in the other direction.

If an external gas source is connected to the quick-connect gas fitting 860 while the release valve 850 is closed, the gas will flow through the plenum 842 and conduit 841 into the control reservoir 835, pressurizing the control reservoir 835 and seating the piston 832 against the primary gas outlet 824 to close the gas valve 800 and sealing the tank 801. As soon as the gas in the control reservoir 835 has enough pressure to open the check valve 865, gas flows from the control reservoir 835 into the primary gas reservoir 805 and begins to pressurize the tank 801. The control reservoir 835 may maintain a higher pressure than the primary gas reservoir 805 by at least the activation pressure of the check-valve 865 which may keep the piston 832 seated against the primary gas outlet 824 even if no spring is included although some embodiments may include a spring between the closed end 831 of the cylinder 830 and the piston 832.

After the primary gas reservoir 805 is at the desired primary pressure and the control reservoir 835 is at a control pressure, the external gas source may be disconnected from the quick-connect gas fitting 860. If the release valve 850 is opened, gas may flow from the control reservoir 835, through the conduit 841, the plenum 842, the release valve 850 and out the exhaust port 859 causing the control pressure to drop. After the control pressure drops below the release pressure, the opening force on the piston 832 may exceed the closing force causing the piston 832 to quickly slide into the cylinder 830 away from the primary gas outlet 824, opening the gas valve 800, and allowing the gas in the primary gas reservoir 805 to exit through the primary gas output opening 820.

Figure 9C:
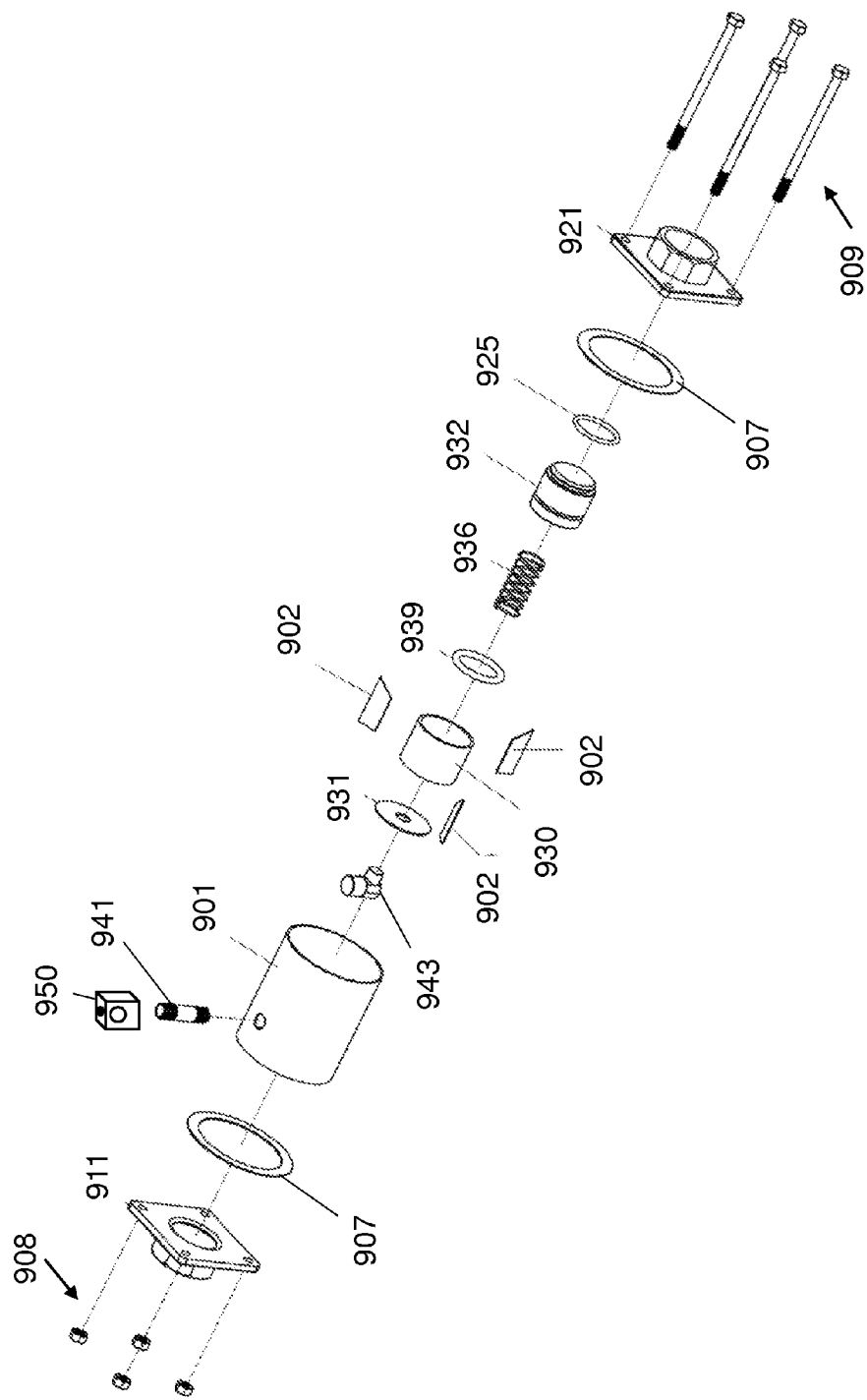
FIG. 9C shows an exploded assembly drawing of the different alternative embodiment of a gas valve.

FIG. 9A shows a cross-sectional side view and FIG. 9B shows a cross-sectional front view of a different alternate embodiment of a gas valve 900 in a closed position and FIG. 9C shows an exploded assembly drawing of the gas valve 900. Gas valve 900 may operate in a very similar way to gas valve 500 and/or gas valve 700 so many details of the construction and operation of gas valve 900 may be left out for simplicity. The gas valve 900 may be made up of a body 901 with an input end cap 911 and an output end cap 921. The two end-caps 911, 921 may be clamped onto the body 901 using four bolts 909 with nuts 908 and gaskets 907 between each end cap 911, 921 and the body 901 to help provide a gas-tight seal.

A cylinder 930 with a closed end 931 may be positioned in the body using three supports 902. The cylinder 930 may be positioned to allow a piston 932 to slide partially out of the cylinder 930 and press against the primary gas outlet 924 with the o-ring 925, to close the gas valve 900. A groove 934 in the piston 932 may be included. The groove 934 may be used to position a piston ring in some embodiments. A spring 936 positioned between the closed end 931 of the cylinder 930 to provide a closing force on the piston 932 and a large o-ring 939 may be included at the back of the cylinder 930 to provide a cushion for the piston 932 as the piston 932 slides back into the cylinder 930 quickly. A control reservoir 935 may be formed in the cylinder between the piston 932 and the closed end 931 of the cylinder 930. The control reservoir 935 may be pneumatically coupled to the input of a release valve 950 by an elbow joint 943 and conduit 941.

If the release valve 950 is closed, gas may enter the control reservoir 935 between the piston 932 and the cylinder 930 to pressurize the control reservoir 935. If the release valve 950 is opened, gas from the control reservoir 935 may exit through the exhaust reservoir 959 to reduce the pressure in the control reservoir 935 to open the gas valve 900. The opening force on the piston 932 may not be as large as the other embodiments shown, but as discussed earlier, the difference between the diameter of the cylinder 930 and the diameter of the primary gas outlet 924 does not need to be large for operation of the gas valve 900. The small gap between the piston and the flat end of the output end cap 921 is enough to allow the pressure of the primary gas reservoir 905 to act on the annular ring of the exposed piston 932 to open the gas valve 900.

Figure 10A:
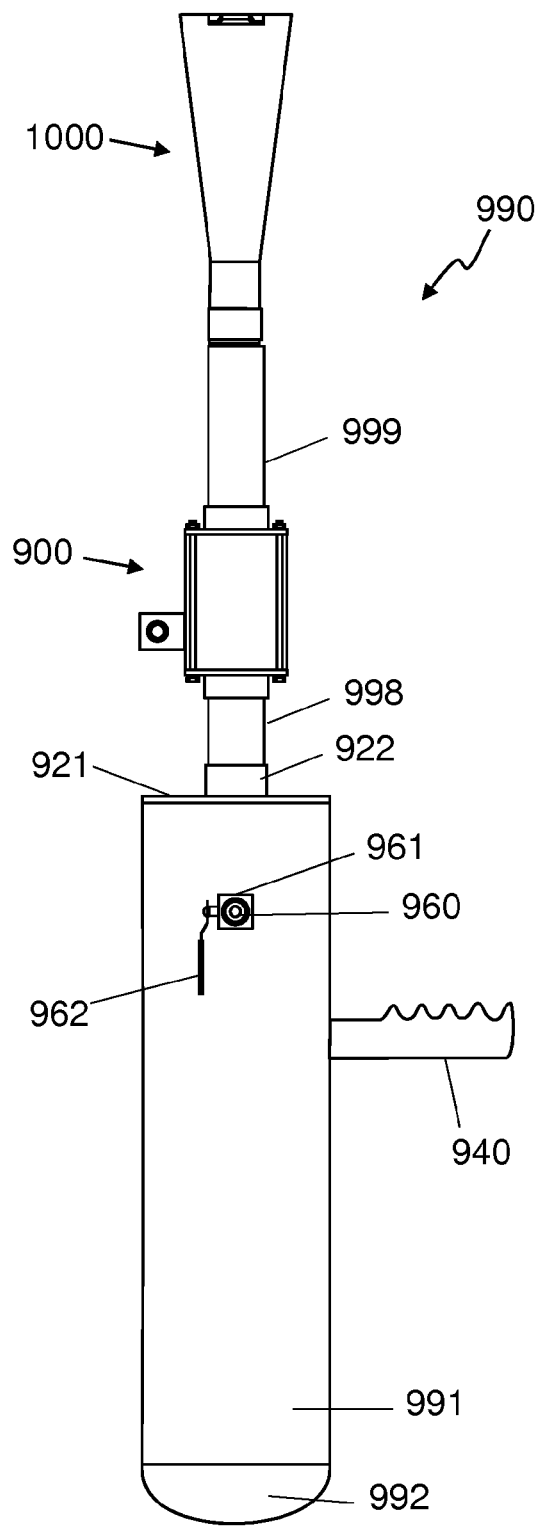
FIG. 10A shows an embodiment of a tire seating system.

FIG. 10A shows an embodiment of a tire seating system 990. The tire seating system 990 may include a pressure vessel or tank 991 with a rounded end 992 and an end cap 921 with an output fitting 922. The tank 991 may be of any size and/or shape and in some embodiments may be cylindrical while in other embodiments may be spherical or some other shape. The embodiment shown has the output fitting 921 emerging axially from the tank 991 but other embodiments may have the output fitting at other places on the tank 991. A grip 940 may be attached to the tank 991 to allow for easy handling of the tire seating device 990.

Input port 960 may allow for an external pressurized gas source to be connected to the tank 991 to fill the tank 991. Input valve 961 which may be controlled by valve handle 962 may be opened to allow the tank 991 to be filled and then closed to allow the pressurized gas in the tank 991 to remain if the external gas source is disconnected.

A first tube 998 may pneumatically couple the tank 991 to an input of gas valve 900. The gas valve 900 may be any of the embodiments described herein but the embodiment shown in FIG. 10A is described below. A second tube 999 may pneumatically couple the gas valve 900 to a nozzle 1000. The nozzle 1000 may be any type of nozzle suitable for blowing air between a rim and a tire including nozzles utilizing the Venturi effect and nozzles with multiple outlets. The embodiment shown in FIG. 10A is a conventional nozzle which will be described in more detail below.

Figure 10B:
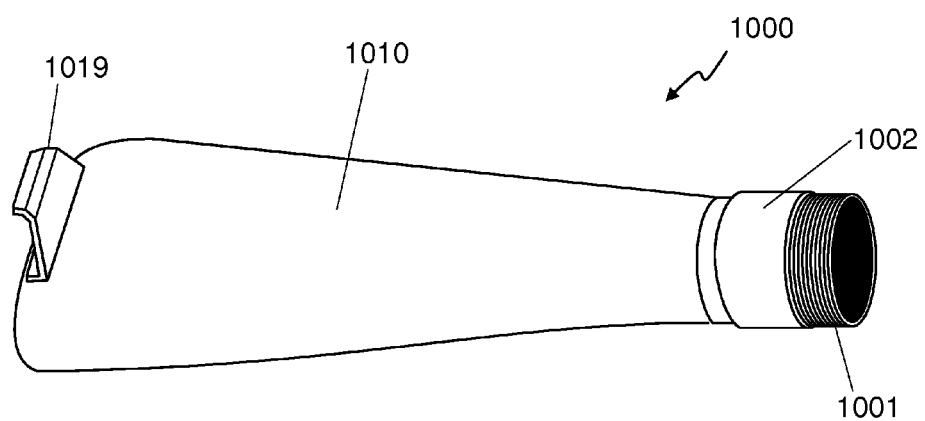
FIG. 10B shows an isometric view from above and behind and FIG. 10C shows a front view of an embodiment of a conventional nozzle that may be used in some embodiments of a tubeless tire seating device.
Figure 10C:
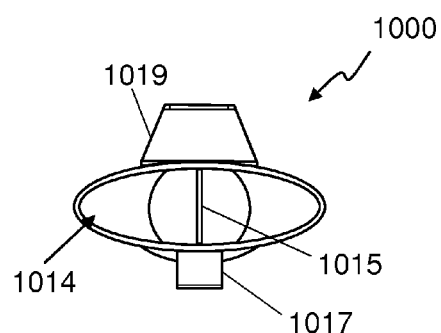

FIG. 10B shows an isometric view from above and behind and FIG. 10C shows a front view of an embodiment of a conventional nozzle 1000 that may be used in some embodiments of a tubeless tire seating device. Conventional nozzle 1000 may have a threaded fitting 1001 to mate to a source of air such as tube 999. A coupling 1002 may mate the threaded fitting 1001 to a spout 1010 that may flatten and widen as it extends away coupler 1002. The nozzle outlet 1014 of the spout 1010 may be rectangular or oval in shape or in some embodiments the nozzle outlet may be round or round with one flattened side or any other shape suitable for blowing air between a tire and rim. Brace 1015 may provide strength to the nozzle outlet 1014 to help keep it from collapsing due to pressure from the tire and/or rim. A rim bracket 1019 may be attached to the top of the spout 1010 to help a user properly position the nozzle 1000 against the lip of the rim. Tire bumper 1017 may help push the tire away from the rim as the nozzle 1000 is positioned to provide more space for the air to enter the tire.

Unless otherwise indicated, all numbers expressing quantities of elements, optical characteristic properties, and so forth used in the specification and claims are to be understood as being modified in all instances by the term "about." Accordingly, unless indicated to the contrary, the numerical parameters set forth in the preceding specification and attached claims are approximations that can vary depending upon the desired properties sought to be obtained by those skilled in the art utilizing the teachings of the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviations found in their respective testing measurements. The recitation of numerical ranges by endpoints includes all numbers subsumed within that range (e.g. 1 to 5 includes 1, 1.5, 2, 2.75, 3, 3.80, 4, and 5).

As used in this specification and the appended claims, the singular forms "a", "an", and "the" include plural referents unless the content clearly dictates otherwise. Thus, for example, reference to an element described as "a port" may refer to a single port, two ports or any other number of ports. As used in this specification and the appended claims, the term "or" is generally employed in its sense including "and/or" unless the content clearly dictates otherwise. As used herein, the term "coupled" includes direct and indirect connections. Moreover, where first and second devices are coupled, intervening devices including active devices may be located there between.

Any element in a claim that does not explicitly state "means for" performing a specified function, or "step for" performing a specified function, is not to be interpreted as a "means" or "step" clause as specified in 35 U.S.C. §112, ¶ 6. In particular the use of "step of" in the claims is not intended to invoke the provision of 35 U.S.C. §112, ¶ 6.

The description of the various embodiments provided above is illustrative in nature and is not intended to limit the invention, its application, or uses. Thus, variations that do not depart from the gist of the invention are intended to be within the scope of the embodiments of the present invention. Such variations are not to be regarded as a departure from the intended scope of the present invention.

What is claimed is:

1. A rapid opening gas valve comprising:
    a primary gas reservoir having a primary gas outlet with an outlet area, the primary gas reservoir being configured to hold primary gas at a primary gas pressure;
    a cylinder with one closed end fixedly positioned inside the primary gas reservoir;
    a piston shaped to fit in the cylinder, the piston having a cross-sectional area greater than the outlet area of the primary gas outlet and positioned in the cylinder, the piston able to slide in a reciprocating motion in the cylinder, wherein a control reservoir having a control pressure is created in the cylinder between the closed end of the cylinder and the piston, a volume of the control reservoir dependent on a position of the piston in the cylinder, the control pressure acting on the piston produces a control pressure force;
    a compressed spring positioned between the closed end of the cylinder and the piston to produce a compression spring force on the piston, a sum of the control pressure force and the compression spring force acting to push the piston towards the primary gas outlet;
    a cushion positioned in the cylinder between the one closed end of the cylinder and the piston, wherein the piston presses the cushion against the one closed end of the cylinder in response to the release valve being in a fully open position;
    means for filling the control reservoir with control gas to the control pressure; and
    a release valve having an input and an outlet, the input of the release valve pneumatically coupled to the control reservoir;
    wherein a release force acts to push the piston in a direction opposite the compression spring force and the control pressure force, the release force being equal to an outlet pressure acting on the outlet area of the primary gas outlet plus the primary gas pressure acting on an area equal to the cross-sectional area of the piston less the outlet area;
    wherein the control pressure force plus the compression spring force being greater than the release force results in the piston being out of contact with the cushion and seated against the primary gas outlet, blocking primary gas from leaving the primary gas reservoir;
    wherein, in response to opening the release valve the control gas in the control reservoir escapes through the outlet of the release valve causing the sum of the control pressure force and the compression spring force to fall below the release force, resulting in the piston quickly sliding into the cylinder, away from the primary gas outlet, to the fully open position within 100 milliseconds, allowing the gas in the primary gas reservoir to flow through the primary gas outlet; and
    wherein the piston comprises a chamfered end configured to seal the primary gas outlet as the piston extends out from the cylinder.

2. The gas valve of claim 1, wherein the cylinder has a circular cross-section.

3. The gas valve of claim 1, wherein the piston includes a piston ring, the piston ring positioned on the outside of the piston in close engagement with an inside wall of the cylinder.

4. The gas valve of claim 3, wherein said means for filling the control reservoir comprise:
    at least one gap in the piston ring to allow the gas to flow from the primary gas reservoir, through said at least one gap, into the control reservoir.

5. The gas valve of claim 1, wherein said means for filling the control reservoir comprise:
    a control gas inlet pneumatically coupled to the control reservoir and configured to allow gas from an external source to flow from the control gas inlet into the control reservoir without first flowing through the primary gas reservoir.

6. The gas valve of claim 5, further comprising:
    a check valve positioned to allow the gas to flow from the control reservoir into the primary gas reservoir if the control pressure is greater than the primary pressure.

7. The gas valve of claim 1, wherein said means for filling the control reservoir comprise:
    a hole in the cylinder to allow the gas to flow from the primary gas reservoir, through said hole, into the control reservoir.

8. The gas valve of claim 1, wherein the release valve is a poppet valve.

9. The gas valve of claim 1, wherein the release valve is manually operated.

10. The gas valve of claim 1, further comprising:
a primary gas input to the primary gas reservoir, the primary gas input located axially with the piston and the primary gas outlet.

11. The gas valve of claim 1, wherein the piston comprises a polymer.

12. The gas valve of claim 11, wherein the polymer is a polyacetal polymer.

13. A tire seating system comprising:
a tank suitable for holding pressurized gas;
the gas valve of claim 1, wherein the primary gas reservoir of the gas valve is pneumatically coupled to the tank; and
a nozzle suitable for blowing gas between a rim and a tire mounted on the rim to seat the tire on the rim;
wherein the nozzle is pneumatically coupled to the primary gas outlet of the gas valve.

14. The gas valve of claim 1, further comprising:
an input port pneumatically coupled to the primary gas reservoir to allow compressed air to enter the primary gas reservoir;
wherein the primary gas reservoir is configured to hold the compressed air after the input port is closed until the release valve is opened.

15. The gas valve of claim 1, wherein said means for filling the control reservoir comprise:
space between the cylinder and the piston to allow the gas to flow from the primary gas reservoir, through said space, into the control reservoir.

16. A rapid opening gas valve comprising:
a primary gas reservoir having a primary gas outlet with an outlet area, the primary gas reservoir being configured to hold primary gas at a primary gas pressure;
a cylinder with a closed end and an open end fixedly positioned inside the primary gas reservoir and oriented with the open end toward the primary gas output;
a piston with a chamfered end positioned in the cylinder and configured to slide in a reciprocating motion in the cylinder, the chamfered end of the piston configured to seal the primary gas outlet if the piston extends out from the cylinder;
a compressed spring positioned between the closed end of the cylinder and the piston to provide a compression spring force that acts to extend the piston out from the cylinder;
a cushion positioned at the closed end of the cylinder, the cushion configured to be out of contact with the piston if the piston is in a position to seal the primary gas outlet, wherein the piston presses the cushion against the closed end of the cylinder upon the release valve being in a fully open position;
a control reservoir located between the closed end of the cylinder and the piston, the control reservoir having a control pressure that acts on the piston to produce a control pressure force, a volume of the control reservoir dependent on a position of the piston in the cylinder, wherein a sum of the control pressure force and the compression spring force acts to push the piston towards the primary gas outlet;
a pneumatic coupler between the primary gas reservoir and the control reservoir to allow gas to pass from the primary gas reservoir to the control reservoir;
a release valve having an input coupled to the control reservoir; and
a gas inlet pneumatically coupled to the primary gas reservoir;
wherein a release force acts to push the piston in a direction opposite the compression spring force and the control pressure force, the release force being equal to an outlet pressure acting on the outlet area of the primary gas outlet plus the primary gas pressure acting on an area equal to the cross-sectional area of the piston less the outlet area; and
wherein, in response to opening the release valve the control pressure in the control reservoir drops causing the sum of the control pressure force and the compression spring force to fall below the release force, resulting in the piston quickly sliding into the cylinder, away from the primary gas outlet, to the fully open position within 100 milliseconds, allowing the gas in the primary gas reservoir to flow through the primary gas outlet.

17. The gas valve of claim 16, wherein the pneumatic coupler comprises space between the cylinder and the piston.

18. The gas valve of claim 1, wherein the cushion comprises an o-ring.

19. The gas valve of claim 16, wherein the piston comprises a polymer.

20. The gas valve of claim 19, wherein the polymer is a polyacetal polymer.

* * * * *